Patented Jan. 12, 1943

2,308,385

UNITED STATES PATENT OFFICE 2,308,385

PREPARATION OF CARBOXYLIC ACID ESTERS AND LACTONE

Richard Pasternack, Islip, and Ray Arthur Patelski, Flushing, N. Y., assignors to Charles Pfizer & Company, Brooklyn, N. Y., a corporation of New Jersey No Drawing. Application January 17, 1942, Serial No. 427,172

5 Claims. (Cl. 260—484)

This application relates to the preparation of useful monocarboxylic acids by stepwise reduction of the optically active tartaric acids, and is a continuation in part of our copending application Serial Number 318,102 U. S. P. 2,277,872. A particular object of the invention is the preparation in a commercially practicable way of the optically active threonic acids and threonolactones, which are useful in the preparation of vitamin C.

Hitherto threonic acid and its derivatives have been prepared with difficulty and only from expensive materials; for example, by alkaline oxidation of arabinose, as in German Patent No. 620,248 (Spengler and Pfannenstiehl, 1934), or by potassium permanganate oxidation of ascorbic acid and subsequent purification of the crude product by distillation under high vacuum (Gätzi and Reichstein, Helv. Chim. Acta 20: 1298–1301 of 1937). The oxidation products were often mixtures difficult to separate, and yields of the desired products were poor.

Our process uses d- or l-tartaric acid and gives almost theoretical yields throughout. By the successive steps of the process which we have devised, either tartaric acid is readily converted in good yield into an ester of the corresponding threuronic acid, threonic acid, or threonolactone. As an example we describe below the various steps in the preparation of l-threonolactone from d-tartaric acid.

The preparation of diacetyltartaric anhydride from tartaric acid was described, for example, by Wohl and Oesterlin (Ber. 34: 1144 of 1901), and is not a part of our invention. It is obvious to esterify this anhydride with the aliphatic alcohols, but the diesters are useless for our purpose. We have found, however, that if diacetyltartaric anhydride is treated at below 100° C. with an anhydrous alcohol, preferably in a dry inert mutual solvent without the addition of any esterification catalyst, the monoester forms in almost quantitative yield. For use in the preparation of the acid chloride the resulting ester need not be isolated.

It is known to convert carboxylic acids into the corresponding acid chlorides by the action of thionyl chloride, phosphorus pentachloride or phosphorus trichloride and chlorine, but in so far as we have been able to determine, this treatment has not been applied to acylated ester acids. The stability of such compounds toward phosphorus pentachloride could not have been predicted. We have found, however, that under our conditions using temperatures below 100° C. the substituents are not lost, and the product in each case is a moderately stable acid chloride of the ester of diacetyltartaric acid used. It may be isolated by crystallization, but is not sufficiently stable to be kept for long periods even under favorable conditions. Treatment of the monoester of diacetyltartaric acid with phosphorus pentachloride is best carried out in a chemically inert liquid medium capable of holding the acid chloride product in solution. The selection and amount of solvent are not critical, but xylene has been found very satisfactory, and in any case a sufficient volume should be present to form a clear solution of the acid chloride product at the temperature used.

The acid chlorides of the lower alcohol monoesters of the diacetyltartaric acids are next reduced by hydrogen according to the general methods of Rosenmund (Ber. 51: 585 of 1918) and Rosenmund and Zetzsche (Ber. 54: 425 and 638 of 1921) for the reduction of acid chlorides. In the complete absence of water, substantially theoretical yields of the corresponding esters of the diacetylthreuronic acids can be obtained. This part of our invention is illustrated by the reduction of the methyl ester of diacetyl-d-tartaric acid chloride by hydrogen using a palladium catalyst.

Lower alcohol esters of the diacetylthreuronic acids are converted to lower alcohol esters of 2,3-diacetylthreonic acids by catalytic hydrogenation. The time required to effect this reduction varies with the pressure of hydrogen used, the catalyst, and the solvent. We have obtained very satisfactory reduction of the esters in dioxan solution at room temperature, using a Raney nickel catalyst and hydrogen at 120 atmospheres pressure.

Hydrolysis and subsequent dehydration of the hydrolyzed products under high vacuum convert the lower alcohol esters of the 2,3-diacetylthreonic acids to threonolactones. Dilute acid hydrolysis of the esters was found to be preferable to alkaline hydrolysis, but either method produced the desired results.

We illustrate our invention by the preparation of l-threonolactone from diacetyl-d-tartaric acid anhydride, but it will be evident that its optical antipode, d-threonolactone, can be prepared by the same series of chemical reactions from l-tartaric acid. Also, it is not intended that our invention be limited by the proportions of materials used in the examples, although almost theoretical yields are obtained by use of the procedures as given. The following is a structural illustration of the preparation of l-threonolactone from diacetyl-d-tartaric anhydride.

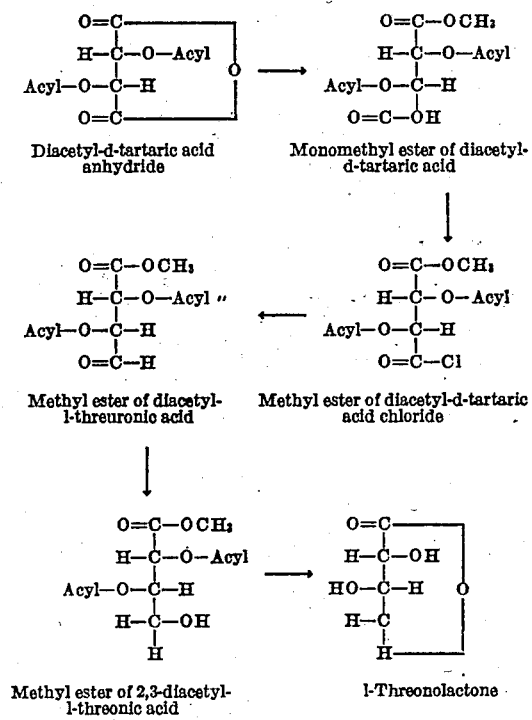

Examples of steps of the process

*Methyl ester of diacetyl-d-tartaric acid.*—A mixture of 216 grams of diacetyl-d-tartaric acid anhydride, 44 cc. of methanol and 250 cc. of dry xylene was refluxed on a steam bath for thirty minutes. The solvents were removed by distillation at subatmospheric pressure, and after recrystallization from acetone the colorless crystalline product melted at 125.5°–127° C.

$$[\alpha]^{20}_D = -20.2°$$

(c, 5 in methanol); $[\alpha]^{20}_D = -21.1°$ (c, 5 in actone). When the product is to be converted to the corresponding acid chloride, it need not be isolated, but should be concentrated by evaporation to about one half volume to remove any traces of methanol. Enough dry xylene is then added to make the total amount present about 300 cc.

*Acid chloride of the methyl ester of diacetyl-d-tartaric acid.*—209 grams (1 mole of 100%) phosphorus pentachloride was added to a suspension of 248 grams of the methyl ester of diacetyl-d-tartaric acid in 300 cc. of dry xylene and the mixture heated on a steam bath until reaction was complete. The solution was then distilled under subatmospheric pressure to remove phosphorus oxychloride. After recrystallization from xylene, the crystalline acid chloride melted at 108°–109° C. $[\alpha]^{20}_D = -37.8°$ (c, 6.4 in chloroform).

*Methyl ester of diacetyl-l-threuronic acid.*—A rapid stream of hydrogen was conducted into a well-stirred suspension of 75 g. of palladized charcoal contained in a solution of 266.5 g. of the methyl ester of d-tartaric acid chloride, 3 cc. of acetyl chloride and 600 cc. of dry xylene. The reaction mixture was maintained at 100°–110° until the evolution of hydrogen chloride had ceased (about 5 hours), the catalyst removed by filtration and the solution cooled. The crystalline product obtained was recrystallized from xylene and possessed a melting point of 86°–87° C. $[\alpha]^{20}_D = +27.5°$ (c, 1 in chloroform); $[\alpha]^{20}_D = -22.5°$ (c, 1 in acetone). It is readily saponified, but we have not been able to crystallize the deacetylated product.

*Methyl ester of 2,3-diacetyl-l-threonic acid.*—A mixture of 232 grams of the methyl ester of diacetyl-l-threuronic acid, 50 g. of Raney nickel and 600 cc. of dioxan was placed in a rocker, bomb-type hydrogenator and subjected to hydrogen at 120 atmospheres pressure. After 12 hours of reaction the catalyst was removed and the crystalline product which resulted when the solvent was evaporated at subatmospheric pressure was recrystallized from xylene; M. P., 79–81° C. $[\alpha]^{20}_D = -25.5°$ (c, 1 in methanol); $[\alpha]^{20}_D = -21.5°$ (c, 1 in acetone).

*l-Threonolactone.*—A solution of 23.4 grams of the methyl ester of 2,3-diacetyl-l-threonic acid, 5 cc. of 50% sulfuric acid and 200 cc. of water was heated on a steam bath for 3 hours. The sulfuric acid was then removed with barium carbonate, the aqueous solution concentrated at subatmospheric pressure, and the sirupy residue which resulted was heated at 100°–105° C. under 0.5–1.0 mm. pressure for 2 hours. (While Gätzi and Reichstein produced threonolactone by distillation under high vacuum, dehydration under high vacuum gives much more satisfactory results, the product being of higher melting point and not contaminated with decomposition products.) The crystalline product which resulted after cooling the residue was washed with acetic acid and then with benzene; M. P., 74°–76° C. $[\alpha]^{20}_D = +47°$ (c, 1.5 in methanol).

We claim:

1. Process for the preparation of acylated aliphatic compounds of the formula $$\begin{array}{l} \text{COOR} \\ \text{CHO—Acyl} \\ \text{CHO—Acyl} \\ \text{CH}_2\text{OH} \end{array}$$

where R is a lower alkyl group, comprising treating diacylated tartaric anhydride with an anhydrous lower aliphatic alcohol to form the monoester; treating the monoester at below 100° C. with one mole of phosphorus pentachloride to form the acid chloride of the ester; reducing the acid chloride group to form the corresponding diacetylthreuronic acid ester; and subsequent catalytic reduction to form the methyl ester of diacetylthreonic acid.

2. Process for the preparation of threonolactones from anhydrides of the optically active diacetyltartaric acids, comprising the combination of the following successive steps: formation of a monomethyl ester of one of the aforesaid tartaric acids by treatment with methyl alcohol at below 100° C. in the absence of a catalyst, conversion of the ester to the corresponding acid chloride by the action of a suitable inorganic acid chloride at temperatures below 100° C., reduction of the acid chloride group by hydrogen in the presence of a palladium catalyst to form the methyl ester of the corresponding diacetylthreuronic acid, isolation of this intermediate, and further reduction of the aldehyde group of the aforesaid threuronic acid by hydrogen at elevated pressures and in the presence of a catalyst to form the corresponding threonic acid ester, complete hydrolysis of the acetylated threonic acid esters, and lactonization of the resulting threonic acid by dehydration under high vacuum at a temperature above 100° C., but below the distillation point.

3. In the preparation of threonolactones from lower alcohol esters of diacetylthreuronic acid, the step of reducing a lower alcohol ester of diacetylthreuronic acid with pressure hydrogen in the presence of a Raney nickel catalyst.

4. As new products, acylated organic compounds of the formula

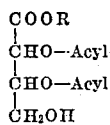

where R is a lower alkyl group.

5. As new products, the methyl esters of the optically active 2,3-diacetylthreonic acids.

RICHARD PASTERNACK.
RAY A. PATELSKI.